A. CAMPBELL.
DUMP CAR.
APPLICATION FILED JAN. 18, 1909.

937,417.

Patented Oct. 19, 1909.
3 SHEETS—SHEET 2.

Witnesses:
H. W. Munday
Esther Abrams.

Inventor:
Argyle Campbell
By Munday, Evarts, Adcock & Clarke.
Attorneys

A. CAMPBELL.
DUMP CAR.
APPLICATION FILED JAN. 18, 1909.
937,417.
Patented Oct. 19, 1909.
3 SHEETS—SHEET 3.
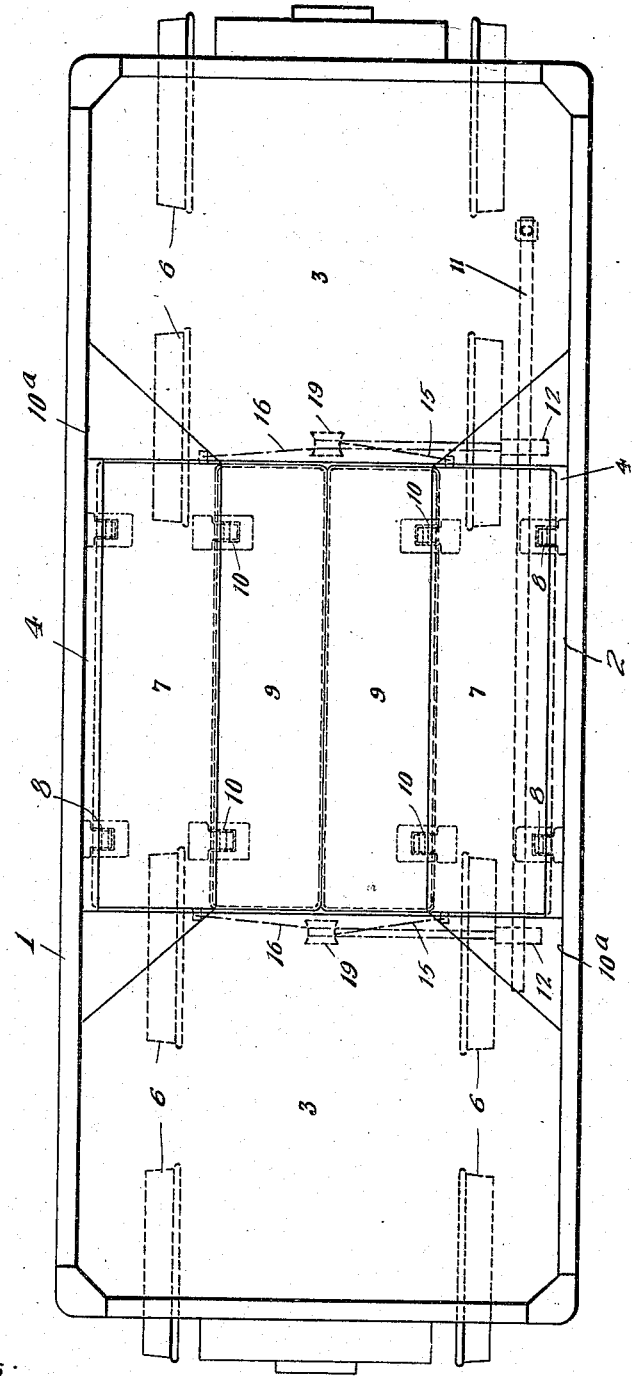
Witnesses:
H. W. Munday
Esther Abrams
Inventor:
Argyle Campbell
By Munday, Evarts, Adcock & Clarke,
Attorneys

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP-CAR.

937,417.      Specification of Letters Patent.      Patented Oct. 19, 1909.

Application filed January 18, 1909. Serial No. 472,785.

*To all whom it may concern:*

Be it known that I, ARGYLE CAMPBELL, a citizen of the United States, residing in Chicago, in the county of Cook and State of Illinois, have invented a new and useful Improvement in Dump-Cars, of which the following is a specification.

My invention relates to improvements in dump cars.

The object of my invention is to provide an improved construction of dump car in which the discharge opening of the car body may be of greater extent both transversely and longitudinally than the clear space between the car wheels.

My invention consists in the means I employ to practically accomplish this object or result. That is to say, it consists in connection with a dump car body having a discharge opening of greater extent both longitudinally and transversely than the clear space between the car wheels, of two main doors hinged at their outer longitudinal edges at or near the sides of the car and adapted to partially close the discharge opening, in combination with two supplemental doors, one of said supplemental doors being carried by and hinged to one of said main doors at its longitudinal inner edge, and the other of said supplemental doors being carried by and hinged to the other of said main doors at its longitudinal inner edge.

My invention further consists in the novel construction of parts and devices and in the novel combinations of parts and devices herein shown and described and more particularly specified in the claims.

Figure 1:
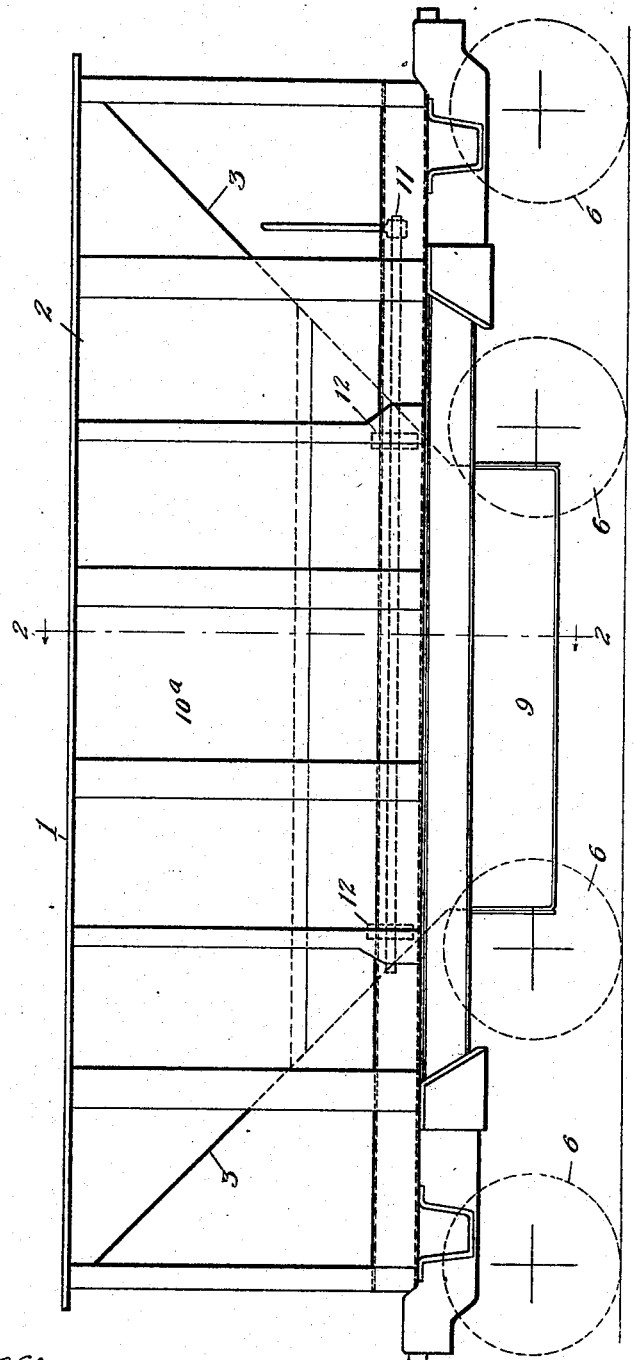
Figure 2:
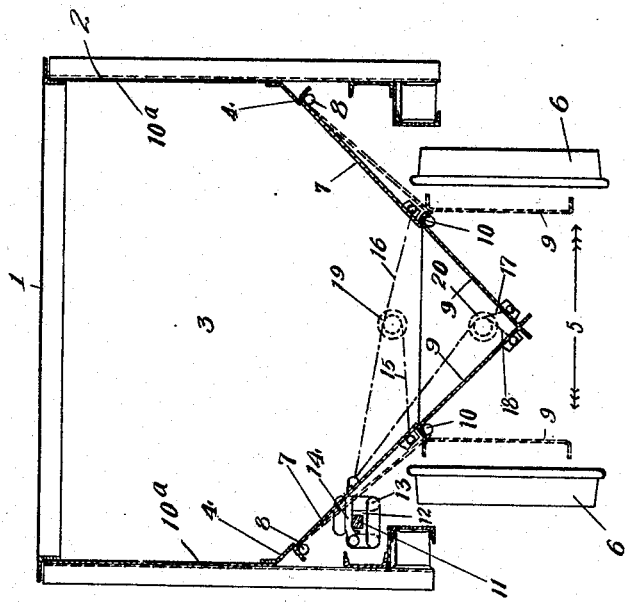

In the accompanying drawing forming a part of this specification, Figure 1 is a side elevation of a dump car embodying my invention. Fig. 2 is a vertical cross section on line 2—2 of Fig. 1 and Fig. 3 is a plan view.

In the drawing 1 represents a dump car having a body 2, furnished with inclined ends 3 and sides 4, constituting a hopper shaped bottom for the car. The body of the dump car has a discharge opening 5 of greater extent both longitudinally and transversely than the clear space between the car wheels 6, and this opening is closed in part by two main or side doors 7, 7, each hinged at its longitudinal edge at 8 to the car body at or near the side thereof, and each of these main or side doors 7 is furnished with a supplemental or inner door 9 carried thereby and hinged thereto at its inner edge by suitable hinges 10, the two supplemental doors closing the remaining portion of the discharge opening.

The opening movement of the two main doors 7, 7, as they are each of greater length than the clear space between the car wheels, and as they are hinged to the car body near the upright sides 10<sup>A</sup> thereof, and thus over the car wheels, is necessarily restricted or limited by the car wheels. The two inner or supplemental doors 9, 9 which are hinged at their outer longitudinal edges to the inner longitudinal edges of the main doors are, however, adapted to open down vertically, and thus to enable the load to be readily and fully discharged as the inner longitudinal edges of the main doors 7, 7, when opened, project over or within the inner faces of the car wheels; so that the car wheels thus cannot interfere with the full opening of the two inner or supplemental doors 9, 9. The main doors 7, 7 carrying the supplemental doors 9, 9 hinged thereto and said supplemental doors may be operated by any suitable door operating mechanism.

The door operating mechanism which I prefer to employ consists of an operating shaft 11, having a polygonal winding drum 12 thereon, in connection with links 13 adapted to wind around said drum and connections 14, 15, 16, 17, 18 extending therefrom to the inner edges of the two main doors 7, 7, and to the inner edges of the two supplemental doors 9, 9 over suitable pulleys 19, 20.

I claim:—

1. In a dump car, the combination with a car body having a discharge opening of greater extent both longitudinally and transversely than the clear space between the car wheels, of a pair of main doors, each of greater length than the clear space between the car wheels, and each hinged at its longitudinal outer edge to the car body near the side thereof, each of said main doors carrying a supplemental door hinged thereto at its inner edge, substantially as specified.

2. In a dump car, the combination with a car body having a discharge opening of greater extent both longitudinally and transversely than the clear space between the car wheels, of a pair of main doors, each of greater length than the clear space between the car wheels, and each hinged at its longitudinal outer edge to the car body near the side thereof, each of said main doors carrying a supplemental door hinged thereto at its inner edge, and door operating mechanism for opening and closing said doors, substantially as specified.

3. In a dump car, the combination with a car body having a discharge opening of greater extent both transversely and longitudinally than the clear space between the car wheels, of a pair of main doors hinged at their outer edges to the car body at opposite parallel edges of said discharge opening, and each carrying a supplemental door hinged thereto at the inner edge of said main door, substantially as specified.

4. In a dump car, the combination with a car body having a discharge opening of greater extent both transversely and longitudinally than the clear space between the car wheels, of a pair of main doors hinged at their outer edges to the car body at opposite parallel edges of said discharge opening, and each carrying a supplemental door hinged thereto at the inner edge of said main door, an operating shaft, a winding drum and connections extending therefrom to the inner edges of both said main doors and to the inner edges of both of said supplemental doors carried by said main doors, substantially as specified.

ARGYLE CAMPBELL.

Witnesses:
H. M. MUNDAY,
PEARL ABRAMS.